(12) United States Patent
Wang et al.

(10) Patent No.: US 10,869,008 B2
(45) Date of Patent: Dec. 15, 2020

(54) PROJECTION SYSTEM AND PROJECTION METHOD THEREOF

(71) Applicant: Coretronic Corporation, Hsin-Chu (TW)

(72) Inventors: Gwo-Chyuan Wang, Hsin-Chu (TW); Chih-Chen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 14 days.

(21) Appl. No.: 14/799,578

(22) Filed: Jul. 15, 2015

(65) Prior Publication Data

US 2016/0191872 A1 Jun. 30, 2016

(30) Foreign Application Priority Data

Dec. 29, 2014 (CN) .......................... 2014 1 0833792

(51) Int. Cl.
| | |
|---|---|
| *H04N 9/31* | (2006.01) |
| *H04N 21/41* | (2011.01) |
| *H04N 21/485* | (2011.01) |
| *H04N 21/436* | (2011.01) |
| *H04W 4/80* | (2018.01) |

(52) U.S. Cl.
CPC ......... *H04N 9/3138* (2013.01); *H04N 9/3179* (2013.01); *H04N 21/4122* (2013.01); *H04N 21/43615* (2013.01); *H04N 21/4854* (2013.01); *H04W 4/80* (2018.02)

(58) Field of Classification Search
CPC ...................................................... H04N 9/31
USPC ....................................................... 348/744
See application file for complete search history.

(56) References Cited

U.S. PATENT DOCUMENTS

| | | | |
|---|---|---|---|
| 2007/0026800 A1 | 2/2007 | Hsu | |
| 2009/0310102 A1* | 12/2009 | Jung | G03B 21/00 |
| | | | 353/122 |
| 2010/0321647 A1* | 12/2010 | Schuler | G06F 1/3203 |
| | | | 353/121 |

(Continued)

FOREIGN PATENT DOCUMENTS

| | | |
|---|---|---|
| CN | 101079776 | 11/2007 |
| CN | 100501557 | 6/2009 |

(Continued)

OTHER PUBLICATIONS

"Office Action of China Counterpart Application," dated May 30, 2018, p. 1-p. 7.

*Primary Examiner* — Jefferey F Harold
*Assistant Examiner* — Justin B Sanders
(74) *Attorney, Agent, or Firm* — JCIPRNET

(57) ABSTRACT

A projection system and a projection method thereof are provided. The projection system includes a projection apparatus and a portable electronic apparatus. The projection apparatus includes a first communication unit, a projection unit and a first control unit. The first communication unit establishes a communication connection with the portable electronic apparatus to receive an identification signal from the portable electronic apparatus. The identification signal includes predetermined projection setup information. The first control unit controls the projection unit to project a image according to the predetermined projection setup information corresponding to the identification signal.

13 Claims, 2 Drawing Sheets

(56) References Cited

U.S. PATENT DOCUMENTS

| | | | | |
|---|---|---|---|---|
| 2014/0289817 A1* | 9/2014 | Matsushima | G06F 3/1454 | 726/4 |
| 2015/0036056 A1* | 2/2015 | Ogawa | G06F 3/14 | 348/744 |
| 2015/0049117 A1* | 2/2015 | Furui | H04N 9/3185 | 345/634 |
| 2016/0080708 A1* | 3/2016 | Urata | H04N 9/3147 | 348/744 |

FOREIGN PATENT DOCUMENTS

| | | |
|---|---|---|
| CN | 103179366 | 6/2013 |
| CN | 103200378 | 7/2013 |
| CN | 103259995 | 8/2013 |
| CN | 103782588 | 5/2014 |
| TW | 201419845 | 5/2014 |
| WO | 2013003440 | 1/2013 |
| WO | 2014035681 | 3/2014 |
| WO | 2014174657 | 10/2014 |

\* cited by examiner

PROJECTION SYSTEM AND PROJECTION METHOD THEREOF

CROSS-REFERENCE TO RELATED APPLICATION

This application claims the priority benefit of China application serial no. 201410833792.0, filed on Dec. 29, 2014. The entirety of the above-mentioned patent application is hereby incorporated by reference herein and made a part of this specification.

BACKGROUND OF THE INVENTION

Field of the Invention

The invention relates to a display apparatus, and more particularly, relates to a projection system and a projection method thereof.

Description of Related Art

In general, a projection apparatus, such as a projector, projects the images onto the projection screen after receiving image signals provided by a signal source apparatus (personal computer, video player, etc.) via a cable with specifications such as High Definition Multimedia Interface (HDMI) or Video Graphics Array (VGA).

However, the projection apparatus with said specifications simply projects the image on an image screen passively. When various adjustments are required to a projected image, such as brightness, contrast ratio or image size, or a specific image content is to be projected, the projection apparatus must be set up manually, resulting in inconveniences in use. Meanwhile, a projection apparatus may be commonly used by different users. Different users may have different preferences on the setup parameters of operating the projection apparatus. A user of the projection apparatus may spend time to change or adjust the setup parameters to meet his/her requirement before presentation or projecting the images, and changing or adjusting the setup parameters may consume time.

Patents or patent publications related to the projection system include, for example, Taiwan Patent Publication No. 201419845, China Patent No. 100501557C, and China Patent Publication No. 103782588A.

The info nation disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention is directed to a projection system and a projection method thereof, which are capable of automatically displaying personalized projection images corresponding to different users according to an identification result of a portable electronic apparatus.

The invention provides a projection apparatus, which is adapted for communicating with a portable electronic apparatus and automatically displaying personalized projection images corresponding to different users according to an identification result of a portable electronic apparatus.

Other objects and advantages of the invention can be further illustrated by the technical features broadly embodied and described as follows.

In order to achieve one or a part of or all of the above advantages or other advantages, an embodiment of the invention provides a projection system which includes a projection apparatus and a portable electronic apparatus. The projection apparatus includes a first communication unit, a projection unit, and a first control unit. The first control unit is coupled to the first communication unit and the projection unit. The first communication unit is adapted to establish a communication connection with the portable electronic apparatus to receive an identification signal from the portable electronic apparatus. The identification signal includes predetermined projection setup information. The first control unit is adapted to control the projection unit to project an image according to the predetermined projection setup information corresponding to the identification signal.

In an embodiment of the invention, the portable electronic apparatus includes a second communication unit and a second control unit. The first control unit of the projection apparatus is adapted to control the first communication unit to send a device signal to the second communication unit of the portable electronic apparatus so that the portable electronic apparatus establishes the communication connection with the projection apparatus according to the device signal. The second control unit is adapted to control the second communication unit to send the identification signal to the projection apparatus.

In an embodiment of the invention, the predetermined projection setup information includes a projection function setup parameter of the projection apparatus.

In an embodiment of the invention, the projection function setup parameter includes a brightness parameter, a contrast ratio parameter, and a size parameter of the image.

In an embodiment of the invention, the identification signal of the portable electronic apparatus further includes login information, and the first control unit is adapted to log in a network server according to the login information corresponding to the identification signal and to control the projection unit to project a user interface of a web service provided by the network server.

In an embodiment of the invention, the communication connection between the first communication unit of the projection apparatus and the portable electronic apparatus includes at least one of a bluetooth communication, a near field communication, and a WiFi communication.

In order to achieve one or a part of or all of the above advantages or other advantages, an embodiment of the invention provides a projection method of projection system. The projection system includes a projection apparatus and a portable electronic apparatus, and the projection apparatus includes a first communication unit and a first control unit. The projection method of projection system includes the following steps. The first communication unit is controlled by the first control unit to establish a communication connection with the portable electronic apparatus to receive an identification signal from the portable electronic apparatus. The identification signal includes predetermined projection setup information. The projection apparatus is controlled to project an image according to the predetermined projection setup information corresponding to the identification signal.

In an embodiment of the invention, the portable electronic apparatus includes a second communication unit. The first communication unit of the projection apparatus sends a device signal to the second communication unit of the portable electronic apparatus so that the portable electronic apparatus establishes the communication connection with the projection apparatus according to the device signal.

In an embodiment of the invention, the identification signal of the portable electronic apparatus further includes login information, and the step of projecting the image according to the predetermined projection setup information corresponding to the identification signal further includes the following steps. A projection function setup parameter of the projection apparatus is set according to the projection setup information. The network server is logged in according to the login information corresponding to the identification signal. The projection apparatus is controlled to project a user interface of a web service provided by the network server.

In order to achieve one or a part of or all of the above advantages or other advantages, an embodiment of the invention provides a projection apparatus, which is adapted for communicating with a portable electronic apparatus. The projection apparatus includes: a first communication unit, a projection unit and a first control unit. The first control unit is coupled to the first communication unit and the projection unit. The first communication unit is adapted to establish a communication connection with the portable electronic apparatus to receive an identification signal from the portable electronic apparatus. The identification signal includes predetermined projection setup information. The first control unit is adapted to control the projection unit to project an image according to the predetermined projection setup information corresponding to the identification signal.

According to the embodiments of the invention, the user of the portable electronic apparatus is identified by receiving the identification signal from the portable electronic apparatus by the projection apparatus. Accordingly, the projection apparatus is capable of automatically projecting the personalized image corresponding to the user, so as to improve the convenience of using the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
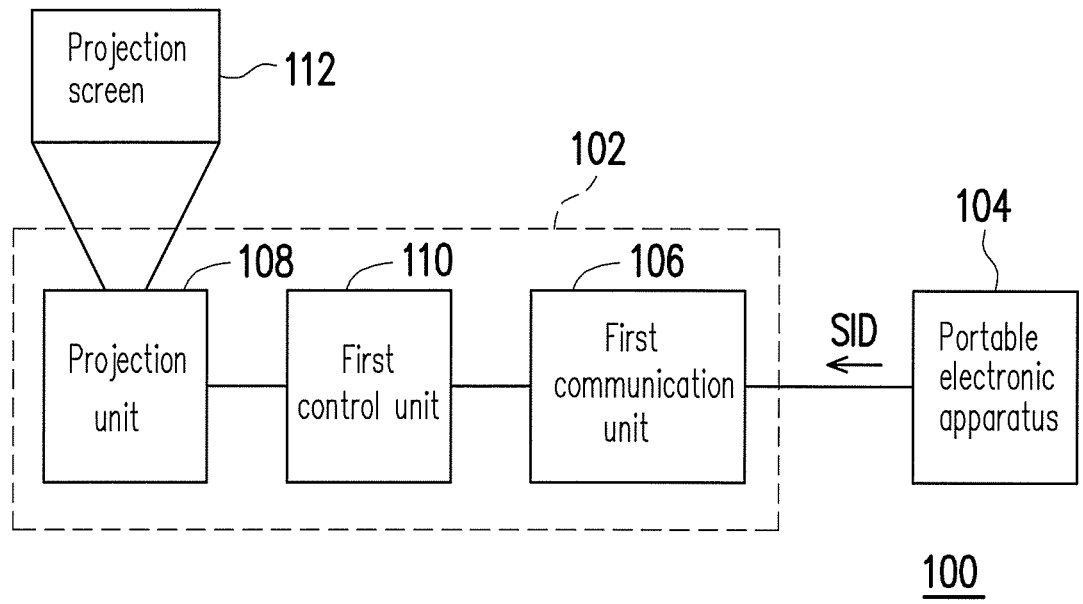
FIG. 1 is a schematic diagram illustrating a projection system according to an embodiment of the invention.

Reference will now be made in detail to the present preferred embodiments of the invention, examples of which are illustrated in the accompanying drawings. Wherever possible, the same reference numerals are used in the drawings and the description to refer to the same or like parts.

It is to be understood that both the foregoing and other detailed descriptions, features and advantages are intended to be described more comprehensively by providing preferred embodiments accompanied with figures hereinafter. The drawings and descriptions will be regarded as illustrative in nature and not as restrictive. The use of "including", "comprising", or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

FIG. 1 is a schematic diagram illustrating a projection system according to an embodiment of the invention. Referring to FIG. 1, a projection system 100 includes a projection apparatus 102 and a portable electronic apparatus 104. The projection apparatus 102 is, for example, a projector or an electronic apparatus having a function of projecting images. The projection apparatus 102 may be, for example, a projection apparatus built-in with an operating system (e.g., the Android operating system). The portable electronic apparatus 104 may be, for example, an electronic apparatus that users may carry with, such as a notebook computer, a tablet computer, or a smart phone.

The projection apparatus 102 includes a first communication unit 106, a projection unit 108 and a first control unit 110. The first communication unit 106 is, for example, a circuit or an IC chip supporting communication such as a bluetooth communication, a near field communication (NFC), a Wireless Fidelity (WiFi) communication, or like. The first communication unit 106 is capable of establishing a connection with other external apparatuses in a wireless manner. The projection unit 108 is, for example, any type image projection element/circuit for projecting an image by utilizing image light beams. The projection unit 108 includes, for example, a projection lens, and may further include a light source to provide an illumination light beam which may be converted to an image light beam. In some embodiment, the projection unit may further include a light engine which may include one or more light valve to convert an illumination light beam to an image light beam for projection. The projection unit 108 may further include a circuit board which may control the light valve and other components, such as a fan and a power supply, in the projection apparatus 102. The first control unit 110 is, for example, a central processing unit (CPU) of single-core or multi-core or other programmable devices for general purpose or special purpose such as a microprocessor and a digital signal processor (DSP), a programmable controller. The first control unit 110 is coupled to the first communication unit 106 and the projection unit 108 respectively.

In operation, in one embodiment, when the portable electronic apparatus 104 detects that the projection apparatus 102 is within a range of a specific area (e.g., in a circumstance where a user carrying the portable electronic apparatus 104 enters a meeting room installed with the projection apparatus 102), the first communication unit 106 of the projection apparatus 102 automatically establishes a wireless communication connection with the portable electronic apparatus 104 by utilizing the bluetooth communication, the near field communication, the WiFi communication, or like, so that the first control unit 110 may receive an identification signal SID from the portable electronic apparatus 104 via the first communication unit 106.

The identification signal SID includes predetermined projection setup information corresponding to the portable electronic apparatus 104 (i.e., corresponding to the user carrying the portable electronic apparatus 104), login information for logging in a network server, and/or a device number or name corresponding to the portable electronic apparatus 104. In other words, the first control unit 110 of the projection apparatus 102 is capable of obtaining the personalized projection setup information corresponding to the user of the portable electronic apparatus 104 by receiving the identification signal SID from the portable electronic apparatus 104. The projection setup information may include, for example, a projection function setup parameter (e.g., including a brightness parameter, a contrast ratio parameter, a size parameter of an projection image, a sound volume parameter, a keystone correction parameter, and horizontal/vertical image position on a projection screen 112) for controlling the projection apparatus 102 and/or an image content of the image on the projection screen 112 projected by the projection unit 108, which the user of the portable electronic apparatus 104 may prefer. The projection screen 112 may be any surface on which an image can be projected. Therefore, the first control unit 110 is capable of controlling the projection unit 108 to project the images personalized for the user of the portable electronic apparatus 104, based one, for example, the projection function setup parameter of the projection apparatus 102 (such as the brightness parameter, the contrast ratio parameter, the size parameter of the projection image, the sound volume parameter, the keystone correction parameter, and/or the horizontal/vertical screen position) and/or the image content, according to the projection setup information corresponding to the identification signal SID. The image content of the projection image on the projection screen 112 projected by the projection unit 108 may include the image presented by a display unit (not illustrated) of the portable electronic apparatus 104, or a video or a document file stored in the portable electronic apparatus 104.

In an embodiment, the first control unit 110 may log in the network server according to the login information corresponding to the identification signal SID and controls the projection unit 108 to project a user interface of a web service provided by the network server. Specifically, the first control unit 110 is capable of obtaining the login information (e.g., account name and password) of the user of the portable electronic apparatus 104 specifically for the network server (i.e., a cloud server such as an E-mail server, a R&D project server, etc.) according to the identification signal SID and conducting an automatic login according to the login information. The login information may be, for example, stored in the first control unit 110 or other storage units (e.g. RAM) in the projection apparatus 102, so that the first control unit 110 may read the login information of the user stored in the projection apparatus 102 according to the identification signal SID. Accordingly, the first control unit 110 of the projection apparatus 102 may then control the projection unit 108 to project the user interface, for example, for transceiving E-mail as provided by the E-mail server, or the user interface, for example, for integrating project issues as provided by the R&D Project server.

Figure 2:
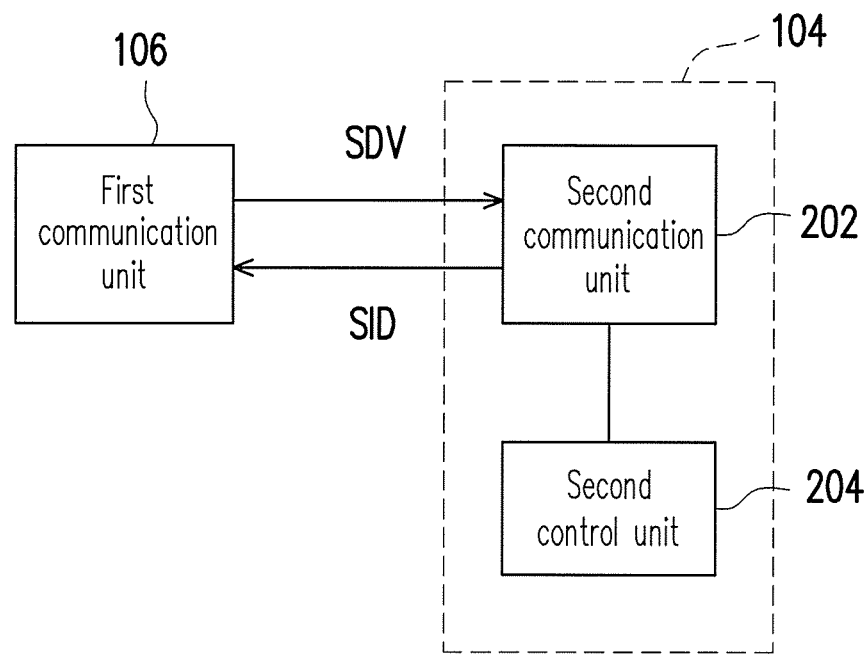
FIG. 2 is a schematic diagram illustrating a portable electronic apparatus according to an embodiment of the invention.

FIG. 2 is a schematic diagram illustrating a portable electronic apparatus according to an embodiment of the invention. The portable electronic apparatus 104 may include, for example, a second communication unit 202 and a second control unit 204, as depicted in FIG. 2. Structures and functions of the second communication unit 202 and the second control unit 204 are identical or similar to those of the first communication unit 106 and the first control unit 110 of the projection apparatus 102 in the foregoing embodiment respectively, and detailed descriptions thereof are not repeated hereinafter.

In operation, the first control unit 110 of the projection apparatus 102 may control the first communication unit 106 to send a device signal SDV to the second communication unit 202 of the portable electronic apparatus 104. After receiving the device signal SDV from the second communication unit 202, the second control unit 204 may determine whether to control the portable electronic apparatus 104 to automatically establish the communication connection with the projection apparatus 102 directly according to the device signal SDV. Alternatively, the user of the portable electronic apparatus 104 may determine whether to establish the communication connection with the projection apparatus 102 according to the device signal SDV. For instance, the projection apparatus 102 may send the device signal SDV to the portable electronic apparatus 104 entered within the range of the specific area (e.g., the meeting room installed with the projection apparatus 102). As such, the portable electronic apparatus 104 may detect the projection apparatus 102 and obtains various setup information required for establishing the wireless communication (e.g., the bluetooth communication, the near field communication, the WiFi communication, or like) with the projection apparatus 102 through the device signal SDV, so that the portable electronic apparatus 104 may establish the connection with the projection apparatus 102, either automatically or manually by the user. Accordingly, the second control unit 204 of the portable electronic apparatus 104 may control the second communication unit 202 to send the identification signal SID to the first communication unit 106 of the projection apparatus 102 so that the projection apparatus 102 may obtain the projection setup information and/or the login information for logging in the network server as included in the identification signal SID in order to project the personalized projection image on the projection screen 112.

In an embodiment, when the portable electronic apparatus 104 establishes the connection with the projection apparatus 102 according to the device signal SDV, the display unit (not illustrated) of the portable electronic apparatus 104 may display a control interface for the projection image. The user may edit and adjust the image content of the personalized projected image through the control interface on the portable electronic apparatus 104.

Figure 3:
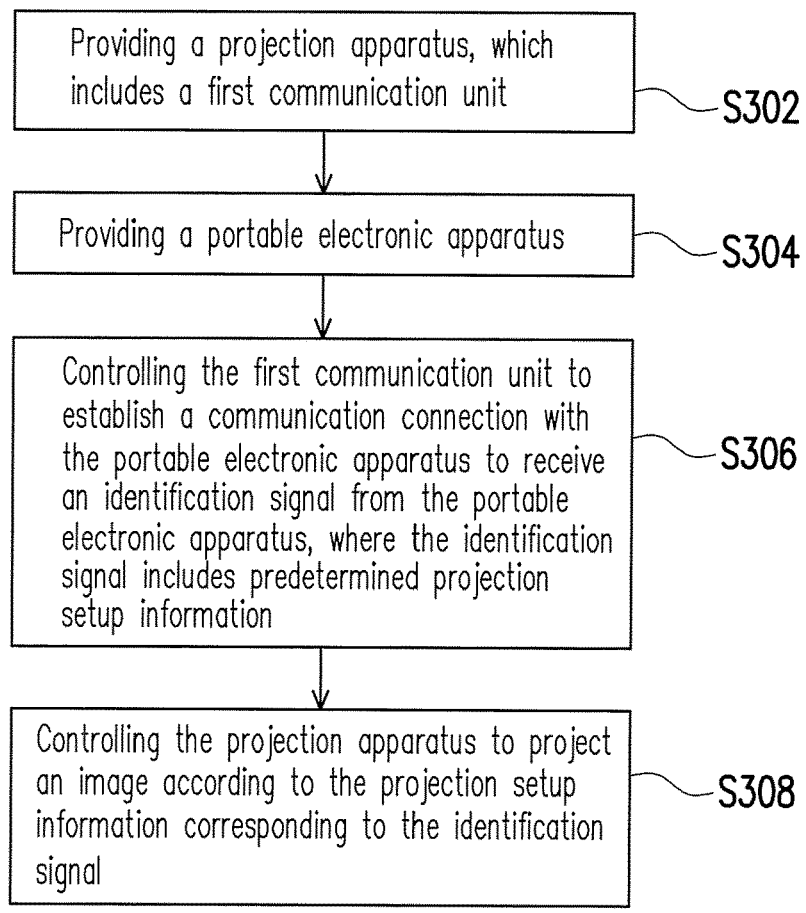
FIG. 3 is a flowchart illustrating a projection method of projection system according to an embodiment of the invention.

FIG. 3 is a flowchart illustrating a projection method of projection system according to an embodiment of the invention. The projection method of projection system at least includes the following steps. First of all, a projection apparatus is provided, and the projection apparatus includes a first communication unit (step S302). A portable electronic apparatus is provided (step S304). The portable electronic apparatus includes a second communication unit. The first communication unit of the projection apparatus sends a device signal to the second communication unit of the portable electronic apparatus, so that the portable electronic apparatus may obtain various setup information required for establishing a wireless connection with the projection apparatus according to the device signal. The first communication unit of the projection apparatus is controlled to establish a communication connection with the portable electronic apparatus to receive an identification signal from the portable electronic apparatus, where the identification signal includes predetermined projection setup information (step S306). The identification signal may further include login information of a user of the portable electronic apparatus for logging in a network server. The projection apparatus is controlled to project an image according to the projection setup information corresponding to the identification signal of the portable electronic apparatus (step S308).

Figure 4:
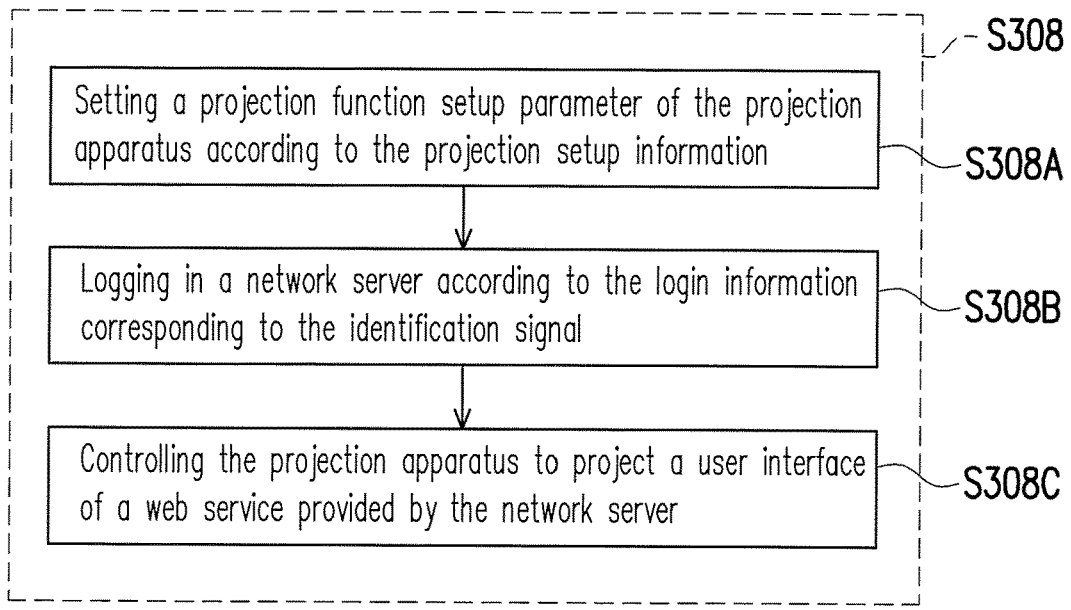
FIG. 4 is a flowchart illustrating a projection method of projection system according to an embodiment of the invention.

FIG. 4 is a flowchart illustrating a projection method of projection system according to an embodiment of the invention. The step of projecting the image according to the projection setup information corresponding to the identification signal (step S308) may further includes the following steps. A projection function setup parameter of the projection apparatus is set according to the projection setup information corresponding to the identification signal (step S308A). The network server is logged in according to the login information corresponding to the identification signal (step S308B). The projection apparatus is controlled to project a user interface of a web service provided by the network server (step S308C), so that the projection apparatus projects the personalized image.

The projection apparatus according to the embodiments of the invention is capable of receiving the identification signal from the portable electronic apparatus through the wireless communication connection established with the portable electronic apparatus, and accordingly conducting identification for the user of the portable electronic apparatus. Therefore, the projection apparatus may automatically project the personalized image according to the projection setup information corresponding to the user, such that the user does not need to manually repeat the setting of the projection apparatus or consume time by manually setting the parameters of projection functions of the projection apparatus. In addition, the projection apparatus may combine use of cloud services according to the login information corresponding to the user of the portable electronic apparatus to obtain personalized information, so as to improve the convenience of using the projection apparatus.

The embodiments described are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the invention. Moreover, the terms such as "first", "second" . . . etc., as recited in the specification are intended to give the elements names, and the maximum number or the minimum number of the elements are not limited thereto.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system comprising:
a portable electronic apparatus; and
a projection apparatus, comprising a first communication unit, a projection unit, and a first control unit;
wherein the first control unit is coupled to the first communication unit and the projection unit, the first communication unit of the projection apparatus is capable of establishing a communication connection with the portable electronic apparatus to receive an identification signal including a personalized projection function setup parameter from the portable electronic apparatus, the projection apparatus conducts an identification for a dedicated user of the portable electronic apparatus, and the first control unit of the projection apparatus is adapted to control the projection unit to project an image onto a projection screen according to the personalized projection function setup parameter prestored in the portable electronic apparatus,
wherein the first control unit of the projection apparatus is adapted to control the first communication unit to send a device signal to the portable electronic apparatus, the portable electronic apparatus detects the device signal and obtains setup information required for establishing wireless communication connection with the projection apparatus through the device signal, so that the portable electronic apparatus establishing the wireless communication connection with the projection apparatus through the device signal,
wherein the projection apparatus projects a personalized projection screen based on the personalized projection function setup parameter included in the identification signal corresponding to the dedicated user of the portable electronic apparatus.

2. The projection system according to claim 1, wherein the portable electronic apparatus comprises a second communication unit and a second control unit, the first control unit of the projection apparatus is adapted to control the first communication unit to send the device signal to the second communication unit of the portable electronic apparatus so that the portable electronic apparatus establishes the communication connection with the projection apparatus according to the device signal, and the second control unit is adapted to control the second communication unit to send the identification signal to the projection apparatus.

3. The projection system according to claim 1, wherein the personalized projection function setup parameter comprises a brightness parameter, a contrast ratio parameter, and a size parameter of the image.

4. The projection system according to claim 1, wherein the identification signal of the portable electronic apparatus further comprises login information, and the first control unit is adapted to log in a network server according to the login information corresponding to the identification signal and to control the projection unit to project a user interface of a web service provided by the network server.

5. The projection system according to claim 1, wherein the communication connection between the first communication unit of the projection apparatus and the portable electronic apparatus comprises at least one of a bluetooth communication, a near field communication, and a WiFi communication.

6. A projection method of projection system, the projection system comprising a projection apparatus and a portable electronic apparatus, the projection apparatus comprising a first communication unit and a first control unit, the projection method comprising:
controlling the first communication unit of the projection apparatus by the first control unit to establish a communication connection with the portable electronic apparatus to receive an identification signal including a personalized projection function setup parameter from the portable electronic apparatus, wherein the projection apparatus conducts an identification for a dedicated user of the portable electronic apparatus; and
controlling the projection apparatus by the first control unit to project an image according to the personalized projection function setup parameter prestored in the portable electronic apparatus,
wherein the first control unit of the projection apparatus is adapted to control the first communication unit to send a device signal to the portable electronic apparatus, the portable electronic apparatus detects the device signal and obtains setup information required for establishing wireless communication connection with the projection apparatus through the device signal, so that the portable electronic apparatus establishing the wireless communication connection with the projection apparatus through the device signal,
wherein the projection apparatus projects a personalized projection screen based on the personalized projection function setup parameter included in the identification signal corresponding to the dedicated user of the portable electronic apparatus.

7. The projection method of projection system according to claim 6, wherein the portable electronic apparatus comprises a second communication unit, the projection method further comprises:
sending the device signal to the second communication unit of the portable electronic apparatus by the first communication unit of the projection apparatus so that the portable electronic apparatus establishes the communication connection with the projection apparatus according to the device signal.

8. The projection method of projection system according to claim 6, wherein the personalized projection function setup parameter comprises a brightness parameter, a contrast ratio parameter, and a size parameter of the image.

9. The projection method of projection system according to claim 6, wherein the identification signal of the portable electronic apparatus further comprises login information, and the step of controlling the projection apparatus by the first control unit to project the image according to the personalized projection function setup parameter prestored in the portable electronic apparatus further comprises:
setting the personalized projection function setup parameter of the projection apparatus according to personalized predetermined projection setup information;
logging in a network server according to the login information corresponding to the identification signal; and
controlling the projection apparatus to project a user interface of a web service provided by the network server.

10. The projection method of projection system according to claim 6, wherein the communication connection established between the first communication unit of the projection apparatus and the portable electronic apparatus comprises at least one of a bluetooth communication, a near field communication, and a WiFi communication.

11. A projection apparatus, adapted for communicating with a portable electronic apparatus, comprising: a first communication unit, a projection unit and a first control unit, wherein the first control unit is coupled to the first communication unit and the projection unit, the first communication unit of the projection apparatus is adapted to establish a communication connection with the portable electronic apparatus to receive an identification signal including a personalized projection function setup parameter from the portable electronic apparatus, the projection apparatus conducts an identification for a dedicated user of the portable electronic apparatus, and the first control unit of the projection apparatus is adapted to control the projection unit to project an image according to the personalized projection function setup parameter prestored in the portable electronic apparatus,
wherein the first control unit of the projection apparatus is adapted to control the first communication unit to send a device signal to the portable electronic apparatus, the portable electronic apparatus detects the device signal and obtains setup information required for establishing wireless communication connection with the projection apparatus through the device signal, so that the portable electronic apparatus establishing the wireless communication connection with the projection apparatus through the device signal,
wherein the projection apparatus projects a personalized projection screen based on the personalized projection function setup parameter included in the identification signal corresponding to the dedicated user of the portable electronic apparatus.

12. The projection system according to claim 1, wherein the first control unit of the projection apparatus is adapted to control the projection unit to project an image onto a projection screen not based on a power status of the portable electronic apparatus, and the personalized projection function setup parameter is not modified based on the power status of the portable electronic apparatus.

13. The projection system according to claim 1, wherein the projection apparatus is capable of identifying the dedicated user of the portable electronic apparatus according to the identification signal.

* * * * *